United States Patent
Rupkalvis et al.

(10) Patent No.: US 10,458,586 B2
(45) Date of Patent: Oct. 29, 2019

(54) METHOD OF MAKING A FLUID MANIFOLD

(71) Applicant: SAINT-GOBAIN PERFORMANCE PLASTICS CORPORATION, Solon, OH (US)

(72) Inventors: Janelle M. Rupkalvis, Midland, MI (US); Clemens E. Zoellner, Bay City, MI (US); Casey S. Allen, Coleman, MI (US); Sandra L. Dollen, Harrison, MI (US); David J. Damzyn, Gladwin, MI (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/918,514

(22) Filed: Mar. 12, 2018

(65) Prior Publication Data
US 2018/0266608 A1   Sep. 20, 2018

Related U.S. Application Data (60) Provisional application No. 62/472,993, filed on Mar. 17, 2017.

(51) Int. Cl.
| | |
|---|---|
| *B29C 45/14* | (2006.01) |
| *F16L 41/02* | (2006.01) |
| *B29C 33/00* | (2006.01) |
| *B29C 45/26* | (2006.01) |
| *B29C 45/44* | (2006.01) |
| *F16L 41/03* | (2006.01) |

(Continued)

(52) U.S. Cl.
CPC .......... *F16L 41/02* (2013.01); *B29C 33/0033* (2013.01); *B29C 45/14* (2013.01); *B29C 45/14065* (2013.01); *B29C 45/14336* (2013.01); *B29C 45/2624* (2013.01); *B29C 45/2626* (2013.01); *B29C 45/2628* (2013.01); *B29C 45/44* (2013.01); *F16L 41/03* (2013.01); *B29C 33/76* (2013.01); *B29L 2023/004* (2013.01)

(58) Field of Classification Search
None
See application file for complete search history.

(56) References Cited

U.S. PATENT DOCUMENTS

| | | | | |
|---|---|---|---|---|
| 3,092,441 A | * | 6/1963 | Bilderbeek | ........... B29C 45/261 264/161 |
| 4,050,667 A | * | 9/1977 | Kossett | ..................... B22C 9/24 249/144 |

(Continued)

FOREIGN PATENT DOCUMENTS

| | | |
|---|---|---|
| JP | H06262650 A | 9/1994 |
| KR | 100776388 B1 | 11/2007 |
| WO | 2018169856 A1 | 9/2018 |

OTHER PUBLICATIONS

International Search Report and Written Opinion for PCT/US2018/021982, dated Jul. 24, 2018, 10 pages.

*Primary Examiner* — Edmund H Lee
(74) *Attorney, Agent, or Firm* — Abel Schillinger, LLP; Chi Suk Kim (57) ABSTRACT

A method of making a fluid manifold may include the use of a mold, a mandrel, and a distal support. A fluid manifold may include a primary channel, a plurality of secondary channels, and a distal channel, and the primary channel may be coterminous with the distal channel.

10 Claims, 5 Drawing Sheets

(51) Int. Cl.
*B29L 23/00* (2006.01)
*B29C 33/76* (2006.01)

(56) References Cited

U.S. PATENT DOCUMENTS

| | | | | |
|---|---|---|---|---|
| 4,312,687 A * | 1/1982 | Sigworth, Jr. | .... | B29C 45/14336 156/245 |
| 4,972,880 A | 11/1990 | Strand | | |
| 5,895,695 A * | 4/1999 | Rowley | ............ | B29C 45/14598 138/109 |
| 6,082,780 A * | 7/2000 | Rowley | ............ | B29C 45/14336 264/271.1 |
| 6,290,265 B1 * | 9/2001 | Warburton-Pitt | ....... | F16L 47/02 285/131.1 |
| 6,432,345 B1 * | 8/2002 | Warburton-Pitt | ............................ B29C 45/14614 264/263 |
| 6,635,214 B2 * | 10/2003 | Rapacki | .................. | A61F 2/064 128/897 |
| 7,407,612 B2 | 8/2008 | Warburton-Pitt et al. | | |
| 7,708,923 B1 * | 5/2010 | Helicke | ............. | B29C 45/14598 264/261 |
| 8,277,714 B1 * | 10/2012 | Blue | ................ | B29C 45/14221 264/139 |
| 8,343,407 B1 * | 1/2013 | Seman, Sr. | ....... | B29C 45/14336 264/275 |
| 9,096,002 B2 * | 8/2015 | Seman, Sr. | ......... | B29C 33/0016 |
| 9,259,563 B2 | 2/2016 | Klingel, Jr. et al. | | |
| 2004/0182095 A1 | 9/2004 | Alles | | |
| 2005/0012334 A1 | 1/2005 | Headley | | |
| 2009/0174185 A1 | 7/2009 | Ziu | | |
| 2009/0243284 A1 | 10/2009 | Klingel, Jr. et al. | | |
| 2014/0216386 A1 | 8/2014 | Shinkai et al. | | |
| 2015/0329812 A1 | 11/2015 | Snyder et al. | | |
| 2016/0146392 A1 | 5/2016 | Pennock et al. | | |
| 2016/0195208 A1 | 7/2016 | Cassiday et al. | | |
| 2016/0279328 A1 | 9/2016 | Feith et al. | | |

* cited by examiner

METHOD OF MAKING A FLUID MANIFOLD

CROSS-REFERENCE TO RELATED APPLICATION(S)

This application claims priority under 35 U.S.C. § 119(e) to U.S. Patent Application No. 62/472,993 entitled "FLUID MANIFOLD AND METHOD OF MAKING SAME", by Janelle M. Rupkalvis et al., filed Mar. 17, 2017, which is assigned to the current assignee hereof and incorporated herein by reference in its entirety.

FIELD OF THE DISCLOSURE

The present disclosure relates to a fluid manifold, and more particularly, to a polymer fluid manifold with a coterminous flow channel and a method of making such a fluid manifold.

BACKGROUND

Fluid manifolds are used in a variety of applications. The biopharmaceutical manufacturing industry has made use of fluid manifolds to transport media used in manufacturing processes. Such manifolds may contain reactants, reaction products, solvents, diluents, buffers, or other liquids used in manufacturing. However, many manifolds used in industry experience reduced performance due to inability to efficiently transport media.

Figure 1:
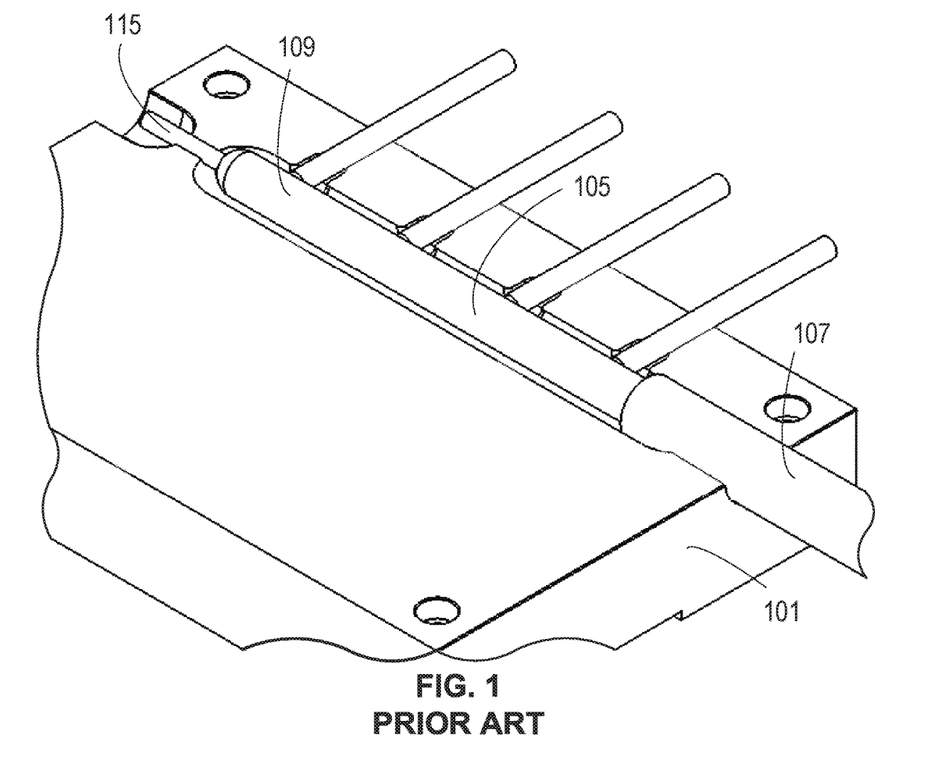
FIG. 1 includes an illustration of an illustration of a perspective view of a portion of a prior art mold and mandrel assembly for manufacturing a fluid manifold.

For example, FIG. 1 includes an illustration of a perspective view of a portion of a prior art mold and mandrel assembly for manufacturing a fluid manifold. As shown in FIG. 1, a mold 101 includes a mandrel 105. The mandrel 105 has a proximal end 107 and a distal end 109. The mandrel 105 is supported at the distal end 109 by a supporting pin 115. The supporting pin 115 allows the mandrel 105 to be suspended above the mold 101. The mold 101 includes a lower half and an upper half that are joined together to encase the mandrel 105, after which a polymer is introduced into the mold 101. The polymer encases the mandrel 105 and is allowed to solidify.

Figure 2:
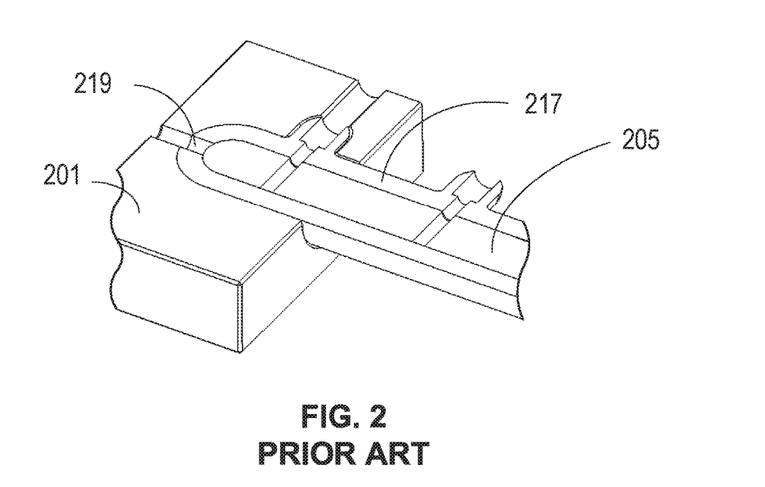
FIG. 2 includes an illustration of a perspective view of a cross section of a prior art mold for completing the manufacture of the fluid manifold.

FIG. 2 includes an illustration of a perspective view of a cross section of a prior art mold for completing the manufacture of the fluid manifold. As shown in FIG. 2, the polymer has solidified to form a fluid manifold 217. The fluid manifold 217 and the mandrel 105 are removed from the mold 101, and the fluid manifold 217 is separated from the mandrel 105 and the support pin 115. A second mandrel 205 is then inserted into the fluid manifold 217, and the fluid manifold 217 and the second mandrel 205 are placed in a second mold 201. The fluid manifold 217 has a pinhole 219 at the distal end where the support pin 115 was previously located. The pinhole 219 is sealed by introducing a polymer into the second mold 201 to plug the pinhole 219. The second mandrel 205 and the fluid manifold 217 are removed from the second mold 201, and the second mandrel 205 is separated from the fluid manifold 217.

While the pinhole 219 has been plugged, the fluid manifold 217 may still experience reduced fluid flow in the region near the plugged pinhole. This can result in a portion of the fluid passing through the fluid manifold 217 becoming stagnant, which is a condition referred to as a "dead zone." Accordingly, there remains a need for fluid manifolds which have improved performance in such applications.

SUMMARY

According to one aspect, a method of making a fluid manifold may include placing the mandrel in a mold, the mandrel comprising a body with a proximal end and a distal end; positioning the mandrel within the mold using a distal support at the distal end of the mandrel; introducing a polymer into the mold; allowing the polymer to solidify to form a fluid manifold; removing the fluid manifold from the mold; and removing the mandrel from the fluid manifold. The distal support may be an integrated part of the fluid manifold. The fluid manifold may include a body having a primary channel and a plurality of secondary channels exiting from the primary channel along a length thereof, including a distal flow channel passing through the distal support. The primary channel may be coterminous with the distal flow channel.

According to another aspect, a fluid manifold may include a body, and the body may include a proximal end, a distal end, a primary channel extending from the proximal end to the distal end, and a plurality of secondary channels exiting from the primary channel along a length thereof, including a distal flow channel disposed at the distal end. The distal flow channel may have an inner diameter $D_{DC}$, and the primary channel and the plurality of secondary channels may be in fluid communication with one another. The primary channel may be coterminous with the distal flow channel.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. Further, the use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the solar control arts.

Embodiments described herein are generally directed to a fluid manifold and to a method of making a fluid manifold. The method may include the use of a mold, a mandrel, and a distal support. The fluid manifold may include a primary channel, a plurality of secondary channels, and a distal channel, and the primary channel may be coterminous with the distal channel.

These concepts are better understood in view of the embodiments described below that illustrate and do not limit the scope of the present disclosure.

Figure 3:
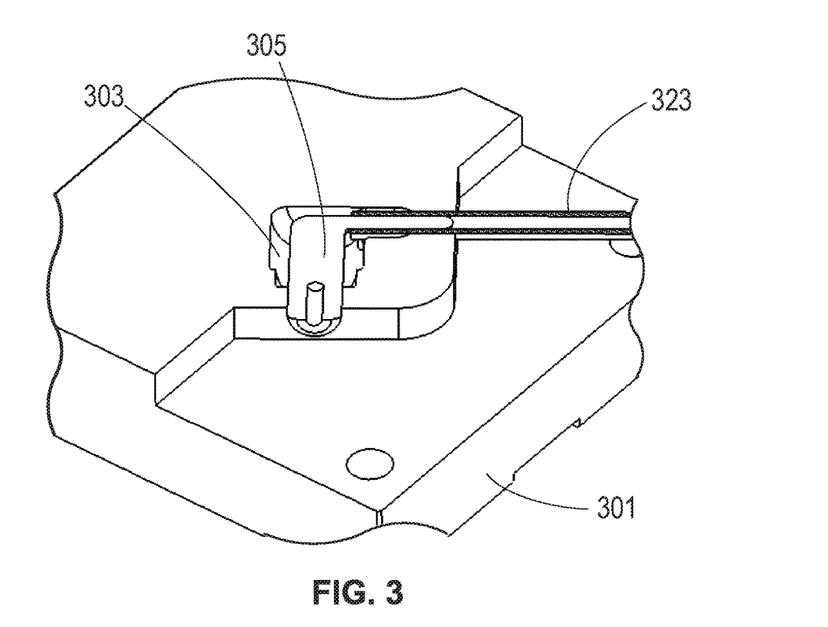
FIG. 3 includes an illustration of a perspective view of a cross section of an example mold and mandrel assembly for manufacturing a distal support according to certain embodiments described herein.

FIG. 3 includes an illustration of a perspective view of a cross section of an example mold and mandrel assembly for manufacturing a distal support according to certain embodiments described herein. In one embodiment, the mold 301 may have a first half and a second half. In another embodiment, the first half may be separated from the second half. In one embodiment, a mandrel 305 may be placed in a cavity 303 of the mold 301. In a certain embodiment, the cavity 303 may define an inner surface of the mold 301. In one embodiment, a polymer may be introduced into the mold 301. In a particular embodiment, a tube 323 may be attached to the mandrel 305 before introducing the polymer. In a further embodiment, the polymer may be injected into the mold 301. In another embodiment, the polymer may be introduced by hand into the mold 301.

Figure 4:
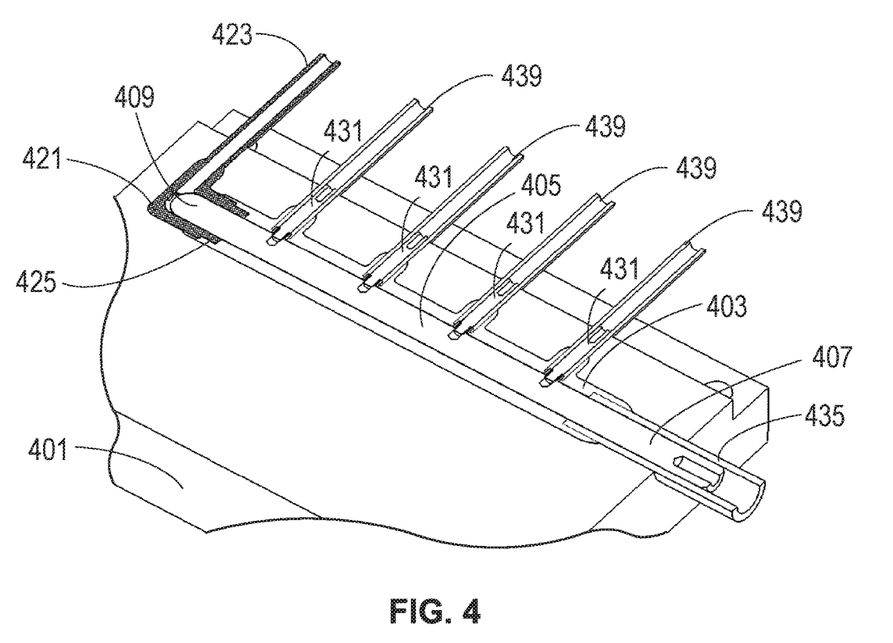
FIG. 4 includes an illustration of a perspective view of an example mold and mandrel assembly for manufacturing a fluid manifold according to certain embodiments described herein.

FIG. 4 includes an illustration of a perspective view of a cross section of an example mold and mandrel assembly for manufacturing a fluid manifold according to certain embodiments described herein. As shown in FIG. 4, a mandrel 405 may be placed in a cavity 403 of a mold 401. In a certain embodiment, the cavity 403 may define an inner surface of the mold 401. In another embodiment, the inner surface of the mold 401 may have a shape that corresponds to a shape of an outer surface of the fluid manifold formed by the mold 401. In a particular embodiment, the mold 401 may include a metal or a polymer. In a further embodiment, the metal may include iron or aluminum, or alloys thereof. In yet another embodiment, the mandrel 405 may include a polymer or a metal.

In an embodiment, the mandrel 405 may have a proximal end 407 and a distal end 409. In one embodiment, a primary tube 435 may be attached to the proximal end 407 of the mandrel 405 to form part of a primary channel after molding. In a further embodiment, a plurality of secondary tubes 439 may be attached to the mandrel 405 to form secondary channels. In another embodiment, the mandrel 405 may be supported at the distal end 409 by a distal support 421. In a certain embodiment, the distal support 421 may position the mandrel 405 within the mold 401. In a particular embodiment, the distal support 421 may also directly contact the mold 401. In another embodiment, a distal tube 423 may be attached to the distal support 409 to also form a secondary channel at the distal end 409, which secondary channel may also be referred to as a distal flow channel. In an embodiment, the distal tube 423 may be attached to the distal support 421. In a further embodiment, the distal support 421 may support the mandrel 405 such that at least a portion of the mandrel 405 along its length between the distal end 409 and the proximal end 407 does not contact the mold 401. In a still further embodiment, the distal support 421 may support the mandrel 405 such that at a majority of the mandrel 405 along its length between the distal end 409 and the proximal end 407 does not contact the mold 401. In a certain embodiment, the distal support 421 may include a step-down region 425 in which the outer diameter of the distal support 421 may be reduced to allow the distal support 421 to be overmolded such that it becomes an integrated part of the fluid manifold after molding.

In an embodiment, the mold 401 may include a lower half and an upper half that are joined together to encase the mandrel 405 and the distal support 421. In another embodiment, the two halves of the mold 401 may be separable. In one embodiment, a polymer may be introduced into the mold 401. In a further embodiment, the polymer may be injected into the mold 401. In another embodiment, the polymer may be introduced by hand into the mold 401. In a particular embodiment, the polymer may fill the cavity of the mold 401 such that it encases the mandrel 405 and the distal support 421. In a certain embodiment, the polymer may be allowed to solidify. After the polymer is solidified, a fluid manifold may be formed. In a further embodiment, the fluid manifold may be removed from the mold 401, and the mandrel 405 may be removed from the fluid manifold. It is to be understood that the distal support 421 may be an integrated part of the fluid manifold.

In another embodiment, the distal support 421 may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

In an embodiment, the mold 401 may have a first half and a second half. In a certain embodiment, the first half may be separated from the second half. In another embodiment, the distal support 421 may be clamped between the first half and the second half. In a further embodiment, the mandrel 405 may have at least one secondary channel arm 431. In a particular embodiment, a secondary tube 439 may be attached to each secondary channel arm 431 before introducing the polymer. In yet another embodiment, primary tube 435 may be attached to the proximal end 407 of the mandrel 405 before introducing the polymer. In another embodiment, one or more of the secondary tubes 439 may directly contact the mold 401. In yet another embodiment, the secondary tubes 439 may be clamped between a first half and a second half of the mold 401. In a particular embodiment, one or more of the primary tube 435 may contact the mold 401. In yet another embodiment, the primary tube 435 may be clamped between a first half and a second half of the mold 401.

Figure 5:
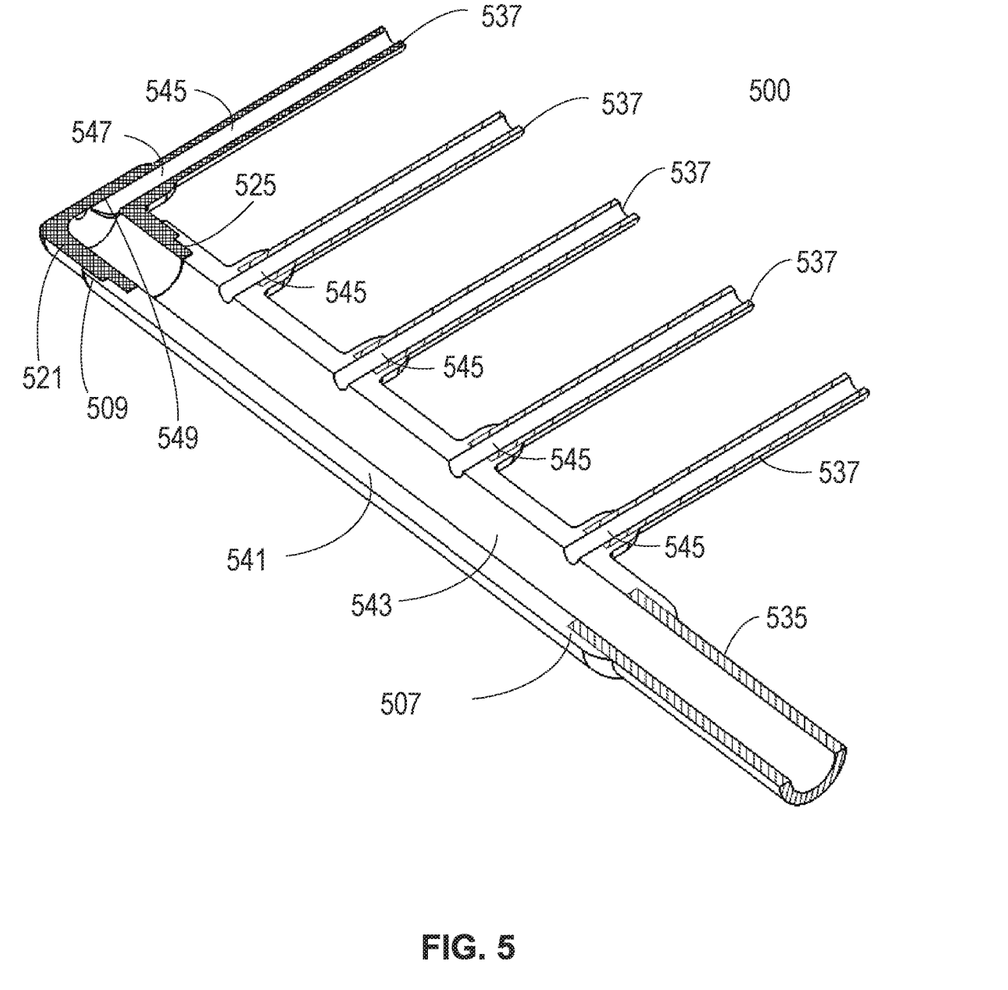
FIG. 5 includes an illustration of a perspective view of a cross section of an example fluid manifold according to certain embodiments described herein.

FIG. 5 includes an illustration of a perspective view of a cross section of an example fluid manifold according to certain embodiments described herein. In an embodiment, the fluid manifold 500 may have a body 541 that may have a primary channel 543 and a plurality of secondary channels 545 exiting from the primary channel 543 along a length thereof, including a distal flow channel 547 passing through the distal support 521. In an embodiment, the fluid manifold 500 may have a proximal end 507 and a distal end 509. In a certain embodiment, the distal flow channel 547 may have an inner diameter $D_{DC}$.

In another embodiment, the primary channel 543 may be coterminous with the distal flow channel 547. In this context, the primary channel 543 is coterminous with the distal flow channel 547 if the primary channel 543 extends to a distance of no more than $0.5*D_{DC}$ beyond a distal edge 549 of the distal flow channel 547. In more particular embodiments, the primary channel 543 may extend to a distance of no more than $0.4*D_{DC}$, or no more than $0.3*D_{DC}$, or no more than $0.25*D_{DC}$, or no more than $0.2*D_{DC}$, or no more than $0.15*D_{DC}$, or no more than $0.1*D_{DC}$, or no more than $0.05*D_{DC}$, or no more than $0.01*D_{DC}$ beyond a distal edge 549 of the distal flow channel 547. In a further embodiment, the primary channel 543 may terminate precisely at the distal edge 549 of the distal flow channel.

In an embodiment, the distal support 521 may be a pre-molded part. In FIG. 5, the distal support 521 is a pre-molded elbow that may have a step-down region 525. In another embodiment, the step-down region 525 may extend into the body 541 of the fluid manifold 500. In embodiments where the distal support 521 is a pre-molded elbow, the primary channel 543 may extend into the pre-molded elbow. In other embodiments, the distal support 521 may be a pre-molded part in another shape.

In a particular embodiment, the primary channel 543 may have an inner diameter that corresponds to an outer diameter of the proximal end 407 of the mandrel 405. In a certain embodiment, the primary channel 543 may have a primary tube 535 overmolded to the primary channel 543. One or more of the secondary channels 545 may have a secondary tube 537 overmolded to the secondary channel 545. In a further embodiment, the distal support 521, the primary tube 535, and each secondary tube 537 may be an integrated part of the fluid manifold 500.

In an embodiment, the cavity 403 of the mold 401 may have an inner diameter corresponding to the outer diameter of the distal flow channel 547 near the primary channel 543, and a second inner diameter corresponding to the outer diameter of the distal flow channel farther from the primary channel 543. In a further embodiment, the first diameter may be greater than the second diameter.

In a particular embodiment, the primary channel 543 may have no dead zone. In a certain embodiment, the primary channel 543 may have an inner diameter $D_{PC}$ and a first axis. In a further embodiment, the distal flow channel may have an inner diameter $D_{DC}$ and a second axis. In another embodiment, the primary channel 543 and the distal flow channel may intersect to form an elbow bend. In an embodiment, the elbow bend may be contained within a volume defined by a sphere that may have a diameter equal to the larger of $D_{PC}$ and $D_{DC}$ and that may be centered at an intersection of the first axis and the second axis.

In a particular embodiment, the primary channel 543 may have a primary tube overmolded to the primary channel 543. In further embodiments, each secondary channel 545 may have a secondary tube overmolded to the secondary channel 545. In further embodiments, the fluid manifold 500 may have at least three secondary channels 545, or at least four secondary channels 545, or at least five secondary channels 545, or at least six secondary channels 545. In one embodiment, a secondary tube may be overmolded to each secondary channel 545. In still further embodiments, each tube may have an inner diameter that corresponds to an inner diameter of the channel at the opening adjacent the tube such that there is a smooth transition from channel to tube.

In a certain embodiment, the primary channel 543 and the distal flow channel 547 may intersect to form an elbow bend. In an embodiment, the elbow bend may have a right angle. In another embodiment, the elbow bend may have an acute angle. In yet another embodiment, the elbow bend may have an obtuse angle.

In another embodiment, the primary channel 543 may have an inner diameter larger than the inner diameter of the secondary channels 545. In a particular embodiment, the primary channel 543 may have an inner diameter larger than the inner diameter of the distal flow channel. In a further embodiment, the primary channel 543 may have an inner diameter equal to the inner diameter of the distal flow channel. In an embodiment, the primary channel 543 may have an inner diameter equal to the inner diameter of the secondary channels 545.

In an embodiment, an axis of the primary channel 543 may be perpendicular to an axis of at least one of the secondary channels 545. In another embodiment, an axis of the primary channel 543 may be perpendicular to an axis of the distal flow channel. In a further embodiment, an axis of at least one secondary channel 545 may be parallel to an axis of another secondary channel 545.

In certain embodiments, the primary channel 543 may have an inner diameter of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm. In further embodiments, the primary channel 543 may have an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm. It will be appreciated that the primary channel 543 may have an inner diameter within a range between any of the minimum and maximum values noted above. It will be further appreciated that the primary channel 543 may have an inner diameter of any value between any of the minimum and maximum values noted above.

In other embodiments, the distal flow 547 channel may have an inner diameter of at least 1 mm, at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm. In further embodiments, the distal flow channel 547 may have an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm. It will be appreciated that the distal flow channel 547 may have an inner diameter within a range between any of the minimum and maximum values noted above. It will be further appreciated that the distal flow channel 547 may have an inner diameter of any value between any of the minimum and maximum values noted above.

In an embodiment, the primary channel 543 may have an inner diameter $D_{PC}$, and the distal flow 547 channel may have an inner diameter $D_{DC}$. In particular embodiments, the fluid manifold 500 may have a ratio of $D_{DC}/D_{PC}$ of less than 1.0. In further embodiments, the fluid manifold 500 may have a ratio of $D_{DC}/D_{PC}$ of at least 0.01, or at least 0.05, or at least 0.1, or at least 0.2, or at least 0.3, or at least 0.4, or at least 0.5, or at least 0.6, or at least 0.7, or at least 0.8, or at least 0.9. In still further embodiments, the fluid manifold 500 may have a ratio of $D_{DC}/D_{PC}$ of not greater than 0.99, or not greater than 0.9, or not greater than 0.8, or not greater than 0.7, or not greater than 0.6, or not greater than 0.5, or not greater than 0.4, or not greater than 0.3, or not greater than 0.2, or not greater than 0.1, or not greater than 0.05. It will be appreciated that the fluid manifold 500 may have a ratio of $D_{DC}/D_{PC}$ within a range between any of the minimum and maximum values noted above. It will be further appreciated that the fluid manifold 500 may have a ratio of $D_{DC}/D_{PC}$ of any value between any of the minimum and maximum values noted above.

In certain embodiments, at least one secondary tube 439 may have an inner diameter of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm. In further embodiments, at least one secondary tube 439 may have an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm. It will be appreciated that the secondary tube 439 may have an inner diameter within a range between any of the minimum and maximum values noted above. It will be further appreciated that the secondary tube 439 may have an inner diameter of any value between any of the minimum and maximum values noted above.

In other embodiments, each secondary tube may have an inner diameter of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm. In further embodiments, each secondary tube may have an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm. It will be appreciated that each secondary tube 439 may have an inner diameter within a range between any of the minimum and maximum values noted above. It will be further appreciated that each secondary tube 439 may have an inner diameter of any value between any of the minimum and maximum values noted above.

In other embodiments, the primary tube 435 may have an inner diameter of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm. In further embodiments, the primary tube 435 may have an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm. It will be appreciated that the primary tube 435 may have an inner diameter within a range between any of the minimum and maximum values noted above. It will be further appreciated that the primary tube 435 may have an inner diameter of any value between any of the minimum and maximum values noted above.

In an embodiment, the primary channel 543 may have a circular cross-section. Alternatively, in another embodiment, the primary channel 543 may have a non-circular cross-section. In another embodiment, the secondary channel 545 may have a circular cross-section. Alternatively, in another embodiment, the secondary channel 545 may have a non-circular cross-section.

In an embodiment, at least one tube may have a circular cross-section. Alternatively, in another embodiment, at least one tube may have a non-circular cross-section. In a further embodiment, each tube may have a circular cross-section. Alternatively, in another embodiment, each tube may have a non-circular cross-section.

In one embodiment, the secondary channels 545 may include outer walls. In particular embodiments, the outer walls of adjacent secondary channels 545 may be separated by a distance of at least 0.1 mm, or at least 0.5 mm, or at least 1 mm, or at least 2 mm, or at least 3 mm, or at least 4 mm, or at least 5 mm, or at least 6 mm, or at least 7 mm, or at least 8 mm, or at least 9 mm, or at least 10 mm, or at least 11 mm, or at least 12 mm, or at least 13 mm, or at least 14 mm. In a still further embodiment, the secondary channels 545 may include outer walls. In further embodiments, the outer walls of adjacent secondary channels 545 may be separated by a distance of not greater than 15 mm, or not greater than 14 mm, or not greater than 13 mm, or not greater than 12 mm, or not greater than 11 mm, or not greater than 10 mm, or not greater than 9 mm, or not greater than 8 mm, or not greater than 7 mm, or not greater than 6 mm, or not greater than 5 mm, or not greater than 4 mm, or not greater than 3 mm, or not greater than 2 mm, or not greater than 1 mm, or not greater than 0.5 mm. It will be appreciated that the outer walls of adjacent secondary channels 545 may be separated by a distance within a range between any of the minimum and maximum values noted above. It will be further appreciated that the outer walls of adjacent secondary channels 545 may be separated by a distance of any value between any of the minimum and maximum values noted above. In another embodiment, the outer walls of adjacent secondary channels 545 may be integrated to one another.

In a certain embodiment, the body 541 may include an integrated molded polymer. In another embodiment, each of the tubes may include a polymer. In further embodiments, each of the tubes may include a thermoplastic, thermoset, elastomer, thermoplastic elastomer, or engineering thermoplastic elastomer. In still further embodiments, each of the tubes may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

In particular embodiments, the fluid manifold 500 may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

In a certain embodiment, the fluid manifold 500 may include an embedded reinforcement material. In a particular embodiment, the reinforcement material may include polyester, adhesion modified polyester, polyamide, polyaramid, or stainless steel. In another embodiment, the reinforcement material may include wire or strands. In a further embodiment, the reinforcement material may include braided wire or braided strands.

In yet another embodiment, the fluid manifold 500 may be encased by a reinforcement shell. In an embodiment, the reinforcement shell may include a polymer. In a further embodiment, the reinforcement shell may include a thermoplastic. In a still further embodiment, the reinforcement shell may include polypropylene.

Figure 6:
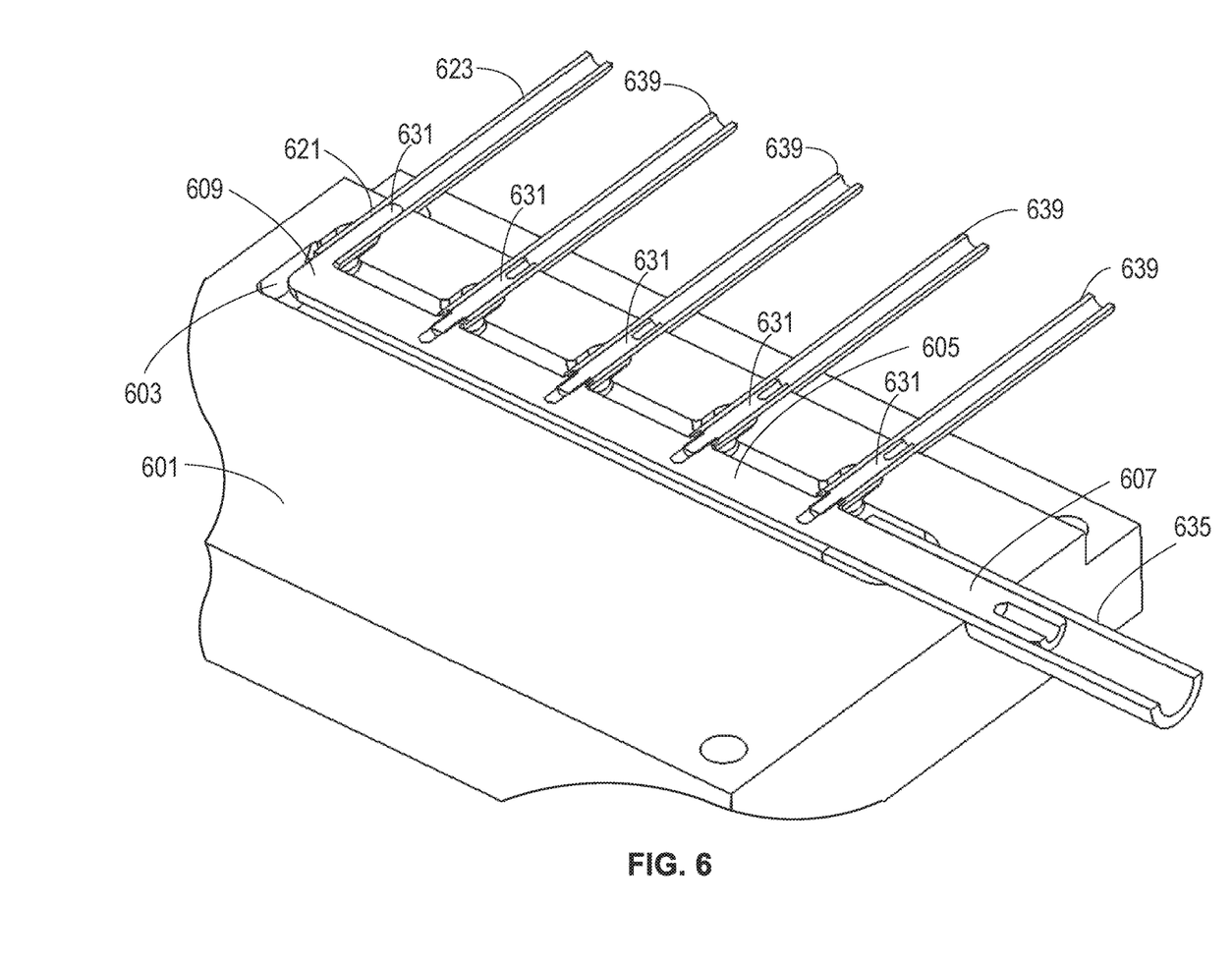
FIG. 6 includes an illustration of a perspective view of a cross section of another example mold and mandrel assembly for manufacturing a fluid manifold according to certain embodiments described herein.

FIG. 6 includes an illustration of a perspective view of a cross section of an example mold and mandrel assembly for manufacturing a fluid manifold according to certain embodiments described herein. As shown in FIG. 6, a mandrel 605 may be placed in a cavity 603 of a mold 601. In a certain embodiment, the cavity 603 may define an inner surface of the mold 601. In another embodiment, the inner surface of the mold 601 may have a shape that corresponds to a shape of an outer surface of the fluid manifold formed by the mold 601. In an embodiment, the mold 601 may include a metal or a polymer. In a particular embodiment, the metal may include stainless steel or aluminum. In a further embodiment, the mandrel 605 may include a polymer or a metal.

In another embodiment, the mandrel 605 may have a proximal end 607 and a distal end 609. In one embodiment, a primary tube 635 may be attached to the proximal end 607 of the mandrel 605 to form part of a primary channel after molding. In a further embodiment, a plurality of secondary tubes 639 may be attached to the mandrel 605 to form secondary channels. In a particular embodiment, the mandrel 605 may contain at least one secondary channel arm 631, and the secondary tubes 639 may be attached to the secondary channel arms 631. In a certain embodiment, the mandrel 605 may be supported at the distal end 609 by a distal support 621. In yet another embodiment, the distal support 621 may position the mandrel 605 within the mold 601. In an embodiment, the distal support 621 may also directly contact the mold 601. In a particular embodiment, the distal support 621 may comprise a distal tube 623 to also form a secondary channel at the distal end 609 of the mandrel 605, which secondary channel may be also referred to as a distal flow channel. In a further embodiment, the distal support 621 may support the mandrel 605 such that at least a portion of the mandrel 605 along its length between the distal end 609 and the proximal end 607 does not contact the mold 601. In a still further embodiment, the distal support 621 may support the mandrel 605 such that at a majority of the mandrel 605 along its length between the distal end 609 and the proximal end 607 does not contact the mold 601. In a further embodiment, the distal support 621 may be overmolded such that it becomes an integrated part of the fluid manifold after molding.

In a certain embodiment, the mold 601 may include a lower half and an upper half that are joined together to encase the mandrel 605 and a portion of the distal support 621. In an embodiment, the two halves of the mold 601 may be separable. In another embodiment, a polymer may be introduced into the mold 601. In a further embodiment, the polymer may be injected into the mold 601. In another embodiment, the polymer may be introduced by hand into the mold 601. In a particular embodiment, the polymer may fill the cavity of the mold 601 such that it encases the mandrel 605 and the distal support 621. In another embodiment, the polymer may be allowed to solidify. After the polymer is solidified, a fluid manifold may be formed. In a further embodiment, the fluid manifold may be removed from the mold 601, and the mandrel 605 may be removed from the fluid manifold. It is to be understood that the distal support 621 may be an integrated part of the fluid manifold. In another embodiment, one or more of the secondary tubes 639 may directly contact the mold 601. In yet another embodiment, the secondary tubes 639 may be clamped between a first half and a second half of the mold 601. In a particular embodiment, one or more of the primary tube 635 may contact the mold 601. In yet another embodiment, the primary tube 635 may be clamped between a first half and a second half of the mold 601.

It will be appreciated that the mold 601, the mandrel 605, the primary tube 635, the secondary tubes 639, and the distal tube 623 of FIG. 6 may have any of the characteristics described herein with reference to the corresponding mold 401, mandrel 405, primary tube 435, secondary tubes 439, and distal tube 423 of FIG. 4.

Figure 7:
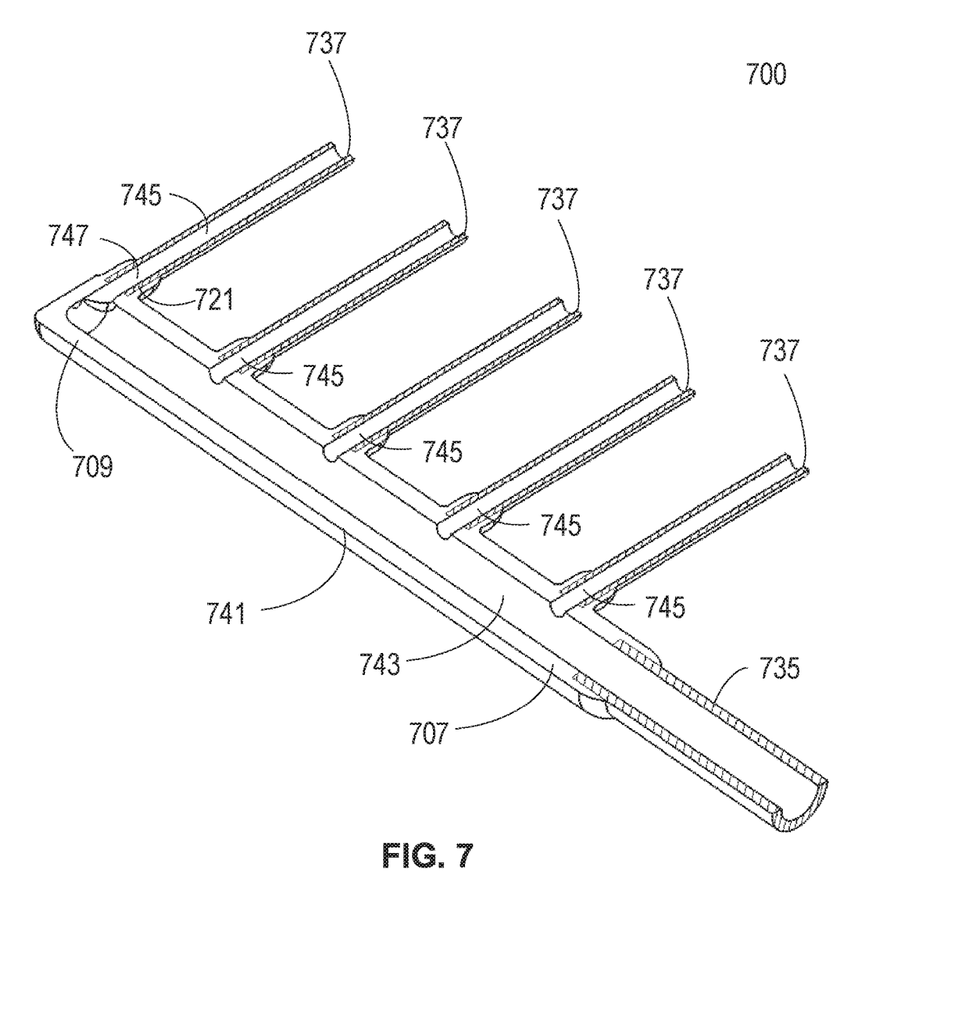
FIG. 7 includes an illustration of a perspective view of a cross section of another example fluid manifold according to certain embodiments described herein.

FIG. 7 includes an illustration of a perspective view of a cross section of an example fluid manifold according to certain embodiments described herein. In a certain embodiment, the fluid manifold 700 may have a body 741 that may have a primary channel 743 and a plurality of secondary channels 745 exiting from the primary channel 743 along a length thereof, including a distal flow channel 747 passing through the distal support 721. In an embodiment, the fluid manifold 700 may have a proximal end 707 and a distal end 709. In a certain embodiment, the distal flow channel 747 may have an inner diameter $D_{DC}$.

In a particular embodiment, the primary channel 743 may be coterminous with the distal flow channel 747. In this context, the primary channel 743 is coterminous with the distal flow channel 747 if the primary channel 743 extends to a distance of no more than $0.5*D_{DC}$ beyond a distal edge 749 of the distal flow channel 747. In more particular embodiments, the primary channel 743 may extend to a distance of no more than $0.4*D_{DC}$, or no more than $0.3*D_{DC}$, or no more than $0.25*D_{DC}$, or no more than $0.2*D_{DC}$, or no more than $0.15*D_{DC}$, or no more than $0.1*D_{DC}$, or no more than $0.05*D_{DC}$, or no more than $0.01*D_{DC}$ beyond a distal edge 749 of the distal flow channel 747. In a further embodiment, the primary channel 743 may terminate precisely at the distal edge 749 of the distal flow channel.

In an embodiment, the distal support 721 may be a pre-formed part. In FIG. 7, the distal support 721 is a tube, the distal tube 723. In a certain embodiment, the distal support 721 may have an inner diameter smaller than the diameter of the fluid manifold 700 at the distal end 709 of the body 741, such that the distal support 721 may extend into the body 741 of the fluid manifold 700 and be overmolded to the fluid manifold 700. Accordingly, the distal support 721 may be an integrated part of the fluid manifold 700.

In another embodiment, the primary channel 743 may have a primary tube 735 overmolded to the primary channel 743. In a particular embodiment, each secondary channel 745 may have a secondary tube 737 overmolded to the secondary channel 745. In a further embodiment, the distal tube 723, the primary tube 735, and each secondary tube 737 may be an integrated part of the fluid manifold 700.

It will be appreciated that the fluid manifold 700, the body 741, the primary tube 735, the secondary tubes 737, the distal tube 723, and the distal support 721 of FIG. 7 may have any of the characteristics described herein with reference to the corresponding fluid manifold 500, the body 541, the primary tube 535, the secondary tubes 537, the distal tube 523, and the distal support 521 of FIG. 5.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A method of making a fluid manifold, the method comprising: placing a mandrel in a mold, the mandrel having a body with a proximal end and a distal end; positioning the mandrel within the mold using a distal support at the distal end of the mandrel; introducing a polymer into the mold; allowing the polymer to solidify to form a fluid manifold; removing the fluid manifold from the mold; and removing the mandrel from the fluid manifold; wherein the distal support is an integrated part of the fluid manifold, wherein the fluid manifold comprises a body having a primary channel and a plurality of secondary channels exiting from the primary channel along a length thereof, including a distal flow channel passing through the distal support, and wherein the primary channel is coterminous with the distal flow channel.

Embodiment 2. The method of embodiment 1, wherein the distal support positions the mandrel within the mold, such that the distal support contacts the mold.

Embodiment 3. The method of embodiment 2, wherein at least a portion of the mandrel along its length between the distal end and the proximal end does not contact the mold.

Embodiment 4. The method of embodiment 2, wherein a majority of the mandrel along its length between the distal end and the proximal end does not contact the mold.

Embodiment 5. The method of embodiment 1, wherein the distal support is a tube.

Embodiment 6. The method of embodiment 1, wherein the distal support is a pre-molded elbow that comprises a step-down region, and wherein the step-down region extends into the body of the fluid manifold.

Embodiment 7. The method of embodiment 1, wherein the distal support is a pre-molded elbow, and wherein the primary channel extends into the pre-molded elbow.

Embodiment 8. The method of embodiment 1, wherein the mold has an inner diameter corresponding to the outer diameter of the distal flow channel near the primary channel, and a second inner diameter corresponding to the outer diameter of the distal flow channel farther from the primary channel, and wherein the first diameter is greater than the second diameter.

Embodiment 9. The method of embodiment 1, wherein the mold comprises a first half and a second half, and wherein the first half can be separated from the second half.

Embodiment 10. The method of embodiment 1, wherein the mold comprises a first half and a second half, wherein the first half can be separated from the second half, and wherein the distal support is clamped between the first half and the second half.

Embodiment 11. The method of embodiment 1, wherein the mandrel comprises at least one secondary channel arm, and wherein the method further comprises attaching a secondary tube to each secondary channel arm before introducing the polymer.

Embodiment 12. The method of embodiment 1, wherein the method further comprises attaching a primary tube to the proximal end of the mandrel before introducing the polymer.

Embodiment 13. The method of embodiment 1, wherein the primary channel has an inner diameter that corresponds to an outer diameter of the proximal end of the mandrel.

Embodiment 14. The method of embodiment 1, wherein the mold comprises a cavity defining an inner surface of the mold, wherein the inner surface of the mold has a shape that corresponds to a shape of an outer surface of the fluid manifold.

Embodiment 15. The method of embodiment 1, wherein the mold comprises two separable halves, and wherein introducing the polymer into the mold comprises injecting the polymer into the mold.

Embodiment 16. The method of embodiment 1, wherein the primary channel comprises a primary tube overmolded to the primary channel, wherein each secondary channel comprises a secondary tube overmolded to the secondary channel, and wherein the distal support, the primary tube, and each secondary tube are an integrated part of the fluid manifold.

Embodiment 17. The method of embodiment 1, wherein the mold comprises a metal or a polymer.

Embodiment 18. The method of embodiment 1, wherein the mold comprises iron or aluminum, or alloys thereof.

Embodiment 19. The method of embodiment 1, wherein the mandrel comprises a polymer or a metal.

Embodiment 20. A fluid manifold comprising a body, wherein the body comprises: a proximal end; a distal end; a primary channel extending from the proximal end to the distal end; and a plurality of secondary channels exiting from the primary channel along a length thereof, including a distal flow channel disposed at the distal end; wherein the distal flow channel has an inner diameter $D_{DC}$, wherein the primary channel and the plurality of secondary channels are in fluid communication with one another, and wherein the primary channel is coterminous with the distal flow channel.

Embodiment 21. The fluid manifold or method of any one of the preceding embodiments, wherein the primary channel has no dead zone.

Embodiment 22. The fluid manifold or method of any one of the preceding embodiments, wherein the primary channel has a first diameter and a first axis, wherein the distal flow channel has a second diameter and a second axis, wherein the primary channel and the distal flow channel intersect to form an elbow bend, and wherein the elbow bend is contained within a volume defined by a sphere, wherein the sphere has a diameter equal to the larger of $D_{PC}$ and $D_{DC}$, and wherein the sphere is centered at an intersection of the first axis and the second axis.

Embodiment 23. The fluid manifold or method of any one of the preceding embodiments, wherein the primary channel extends to a distance of no more than $0.4*D_{DC}$, or no more than $0.3*D_{DC}$, or no more than $0.25*D_{DC}$, or no more than $0.2*D_{DC}$, or no more than $0.15*D_{DC}$, or no more than $0.1*D_{DC}$, or no more than $0.05*D_{DC}$, or no more than $0.01*D_{DC}$ beyond a distal edge of the distal flow channel.

Embodiment 24. The fluid manifold or method of any one of the preceding embodiments, wherein the primary channel is rectilinear.

Embodiment 25. The fluid manifold or method of any one of the preceding embodiments, wherein the primary channel comprises a primary tube overmolded to the primary channel.

Embodiment 26. The fluid manifold or method of any one of the preceding embodiments, wherein each secondary channel comprises a secondary tube overmolded to the secondary channel.

Embodiment 27. The fluid manifold or method of any one of the preceding embodiments, wherein the fluid manifold comprises at least three secondary channels, and wherein a secondary tube is overmolded to each secondary channel.

Embodiment 28. The fluid manifold or method of any one of the preceding embodiments, wherein the fluid manifold comprises at least four secondary channels, and wherein a secondary tube is overmolded to each secondary channel.

Embodiment 29. The fluid manifold or method of any one of the preceding embodiments, wherein the fluid manifold comprises at least five secondary channels, and wherein a secondary tube is overmolded to each secondary channel.

Embodiment 30. The fluid manifold or method of any one of the preceding embodiments, wherein the fluid manifold comprises at least six secondary channels, and wherein a secondary tube is overmolded to each secondary channel.

Embodiment 31. The fluid manifold or method of any one of the preceding embodiments, wherein each tube has an inner diameter that corresponds to an inner diameter of the channel at the opening adjacent the tube.

Embodiment 32. The fluid manifold or method of any one of the preceding embodiments, wherein the elbow bend has a right angle.

Embodiment 33. The fluid manifold or method of any one of the preceding embodiments, wherein the elbow bend has an acute angle.

Embodiment 34. The fluid manifold or method of any one of the preceding embodiments, wherein the elbow bend has an obtuse angle.

Embodiment 35. The fluid manifold or method of any one of the preceding embodiments, wherein the primary channel has an inner diameter larger than the diameter of each of the secondary channels.

Embodiment 36. The fluid manifold or method of any one of the preceding embodiments, wherein the primary channel has an inner diameter larger than the diameter of the distal flow channel.

Embodiment 37. The fluid manifold or method of any one of the preceding embodiments, wherein the primary channel has an inner diameter equal to the diameter of the distal flow channel.

Embodiment 38. The fluid manifold or method of any one of the preceding embodiments, wherein the primary channel has an inner diameter equal to the diameter of each of the secondary channels.

Embodiment 39. The fluid manifold or method of any one of the preceding embodiments, wherein an axis of the primary channel is perpendicular to an axis of at least one of the secondary channels.

Embodiment 40. The fluid manifold or method of any one of the preceding embodiments, wherein an axis of the primary channel is perpendicular to an axis of the distal flow channel.

Embodiment 41. The fluid manifold or method of any one of the preceding embodiments, wherein an axis of at least one secondary channel is parallel to an axis of another secondary channel.

Embodiment 42. The fluid manifold or method of any one of the preceding embodiments, wherein the fluid manifold 500 comprises a ratio of $D_{DC}/D_{PC}$ of at least 0.01, or at least 0.05, or at least 0.1, or at least 0.2, or at least 0.3, or at least 0.4, or at least 0.5, or at least 0.6, or at least 0.7, or at least 0.8, or at least 0.9.

Embodiment 43. The fluid manifold or method of any one of the preceding embodiments, wherein the fluid manifold 500 comprises a ratio of $D_{DC}/D_{PC}$ of not greater than 0.99, or not greater than 0.9, or not greater than 0.8, or not greater than 0.7, or not greater than 0.6, or not greater than 0.5, or not greater than 0.4, or not greater than 0.3, or not greater than 0.2, or not greater than 0.1, or not greater than 0.05.

Embodiment 44. The fluid manifold or method of any one of the preceding embodiments, wherein the primary channel comprises an inner diameter of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm.

Embodiment 45. The fluid manifold or method of any one of the preceding embodiments, wherein the primary channel comprises an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm.

Embodiment 46. The fluid manifold or method of any one of the preceding embodiments, wherein the distal flow channel comprises an inner diameter of at least 1 mm, at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm.

Embodiment 47. The fluid manifold or method of any one of the preceding embodiments, wherein the distal flow channel comprises an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm.

Embodiment 48. The fluid manifold or method of any one of the preceding embodiments, wherein at least one secondary tube has an inner diameter of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm.

Embodiment 49. The fluid manifold or method of any one of the preceding embodiments, wherein at least one secondary tube has an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm.

Embodiment 50. The fluid manifold or method of any one of the preceding embodiments, wherein each secondary tube has an inner diameter of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm.

Embodiment 51. The fluid manifold or method of any one of the preceding embodiments, wherein each secondary tube has an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm.

Embodiment 52. The fluid manifold or method of any one of the preceding embodiments, wherein the primary tube has an inner diameter of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm.

Embodiment 53. The fluid manifold or method of any one of the preceding embodiments, wherein the primary tube has an inner diameter of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm.

Embodiment 54. The fluid manifold or method of any one of the preceding embodiments, wherein the primary channel comprises a circular cross-section.

Embodiment 55. The fluid manifold or method of any one of the preceding embodiments, wherein the primary channel comprises a non-circular cross-section.

Embodiment 56. The fluid manifold or method of any one of the preceding embodiments, wherein the secondary channel comprises a circular cross-section.

Embodiment 57. The fluid manifold or method of any one of the preceding embodiments, wherein the secondary channel comprises a non-circular cross-section.

Embodiment 58. The fluid manifold or method of any one of the preceding embodiments, wherein at least one tube comprises a circular cross-section.

Embodiment 59. The fluid manifold or method of any one of the preceding embodiments, wherein at least one tube comprises a non-circular cross-section.

Embodiment 60. The fluid manifold or method of any one of the preceding embodiments, wherein each tube comprises a circular cross-section.

Embodiment 61. The fluid manifold or method of any one of the preceding embodiments, wherein each tube comprises a non-circular cross-section.

Embodiment 62. The fluid manifold or method of any one of the preceding embodiments, wherein the secondary channels comprise outer walls, and wherein the outer walls of adjacent secondary channels are separated by a distance of at least 0.1 mm, or at least 0.5 mm, or at least 1 mm, or at least 2 mm, or at least 3 mm, or at least 4 mm, or at least 5 mm, or at least 6 mm, or at least 7 mm, or at least 8 mm, or at least 9 mm, or at least 10 mm, or at least 11 mm, or at least 12 mm, or at least 13 mm, or at least 14 mm.

Embodiment 63. The fluid manifold or method of any one of the preceding embodiments, wherein the secondary channels comprise outer walls, and wherein the outer walls of adjacent secondary channels are separated by a distance of not greater than 15 mm, or not greater than 14 mm, or not greater than 13 mm, or not greater than 12 mm, or not greater than 11 mm, or not greater than 10 mm, or not greater than 9 mm, or not greater than 8 mm, or not greater than 7 mm, or not greater than 6 mm, or not greater than 5 mm, or not greater than 4 mm, or not greater than 3 mm, or not greater than 2 mm, or not greater than 1 mm, or not greater than 0.5 mm.

Embodiment 64. The fluid manifold or method of any one of the preceding embodiments, wherein the secondary channels comprise outer walls, and wherein the outer walls of adjacent secondary channels are integrated to one another.

Embodiment 65. The fluid manifold or method of any one of the preceding embodiments, wherein the body comprises an integrated molded polymer.

Embodiment 66. The fluid manifold or method of any one of the preceding embodiments, wherein each of the tubes comprises a polymer.

Embodiment 67. The fluid manifold or method of any one of the preceding embodiments, wherein each of the tubes comprises a thermoplastic, thermoset, elastomer, thermoplastic elastomer, or engineering thermoplastic elastomer.

Embodiment 68. The fluid manifold or method of any one of the preceding embodiments, wherein each of the tubes comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

Embodiment 69. The fluid manifold or method of any one of the preceding embodiments, wherein the fluid manifold comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

Embodiment 70. The fluid manifold or method of any one of the preceding embodiments, wherein the distal support comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

Embodiment 71. The fluid manifold or method of any one of the preceding embodiments, wherein the fluid manifold comprises an embedded reinforcement material.

Embodiment 72. The fluid manifold or method of any one of the preceding embodiments, wherein the fluid manifold comprises an embedded reinforcement material, wherein the reinforcement material comprises polyester, adhesion modified polyester, polyamide, polyaramid, or stainless steel.

Embodiment 73. The fluid manifold or method of any one of the preceding embodiments, wherein the fluid manifold comprises an embedded reinforcement material, wherein the reinforcement material comprises wire or strands.

Embodiment 74. The fluid manifold or method of any one of the preceding embodiments, wherein the fluid manifold comprises an embedded reinforcement material, wherein the reinforcement material comprises braided wire or braided strands.

Embodiment 75. The fluid manifold or method of any one of the preceding embodiments, wherein the fluid manifold is encased by a reinforcement shell.

Embodiment 76. The fluid manifold or method of any one of the preceding embodiments, wherein the fluid manifold is encased by a reinforcement shell, and wherein the reinforcement shell comprises a polymer, a thermoplastic, such as polypropylene Embodiment 77. The fluid manifold or method of any one of the preceding embodiments, wherein the fluid manifold is encased by a reinforcement shell, and wherein the reinforcement shell comprises a thermoplastic.

Embodiment 78. The fluid manifold or method of any one of the preceding embodiments, wherein the fluid manifold is encased by a reinforcement shell, and wherein the reinforcement shell comprises polypropylene.

The foregoing embodiments represent a departure from the state-of-the-art. Notably, the fluid manifold and the method of making a fluid manifold described herein include a combination of features not previously recognized in the art and facilitate performance improvements. Such features can include, but are not limited to, the use of a distal support in a process for molding a fluid manifold, particularly where the distal support becomes an integrated part of the fluid manifold formed; a fluid manifold that has an elbow bend without a dead zone; selection of materials; particular configurations and dimensions of the fluid manifold, of the mold and mandrel assembly, and of the primary tube, secondary tubes, and distal tube; and particular methods of forming a fluid manifold. The fluid manifolds described herein have demonstrated remarkable and unexpected improvements over state-of-the-art manifolds. In particular, they have shown improved fluid flow, reduced fluid stagnation, low cost, durability, ease of manufacture, and ease of use.

Note that not all of the activities described above in the general description are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of making a fluid manifold, the method comprising:
   placing a mandrel in a mold, the mandrel having a body with a proximal end and a distal end;
   positioning the mandrel within the mold using a distal support at the distal end of the mandrel;
   introducing a polymer into the mold;
   allowing the polymer to solidify to form a fluid manifold;
   removing the fluid manifold from the mold; and
   removing the mandrel from the fluid manifold;
   wherein the distal support is an integrated part of the fluid manifold,
   wherein the fluid manifold comprises a body having a primary channel and a plurality of secondary channels exiting from the primary channel along a length thereof, including a distal flow channel passing through the distal support,
   wherein the distal flow channel has an inner diameter, $D_{DC}$ and
   wherein the primary channel is coterminous with the distal flow channel, wherein the primary channel extends to a distance of no more than $0.5*D_{DC}$ beyond a distal edge of the distal flow channel, and wherein the primary channel and the distal flow channel intersect to form an elbow bend.

2. The method of claim 1, wherein the distal support positions the mandrel within the mold, such that the distal support contacts the mold.

3. The method of claim 2, wherein at least a portion of the mandrel along its length between the distal end and the proximal end does not contact the mold.

4. The method of claim 1, wherein the distal support is a tube.

5. The method of claim 1, wherein the distal support is a pre-molded elbow that comprises a step-down region, and wherein the step-down region extends into the body of the fluid manifold.

6. The method of claim 1, wherein the distal support is a pre-molded elbow, and wherein the primary channel extends into the pre-molded elbow.

7. The method of claim 1, wherein the mold has a first inner diameter corresponding to the outer diameter of the distal flow channel near the primary channel, and a second inner diameter corresponding to the outer diameter of the distal flow channel farther from the primary channel, and wherein the first inner diameter is greater than the second inner diameter.

8. The method of claim 1, wherein the mold comprises a first half and a second half, and wherein the first half can be separated from the second half.

9. The method of claim 1, wherein a majority of the mandrel along its length between the distal end and the proximal end does not contact the mold.

10. The method of 1, wherein the mold comprises a first half and a second half, wherein the first half can be separated from the second half, and wherein the distal support is clamped between the first half and the second half.

* * * * *

UNITED STATES PATENT AND TRADEMARK OFFICE
CERTIFICATE OF CORRECTION

Page 1 of 1

PATENT NO. : 10,458,586 B2
APPLICATION NO. : 15/918514
DATED : October 29, 2019
INVENTOR(S) : Janelle M. Rupkalvis et al.

It is certified that error appears in the above-identified patent and that said Letters Patent is hereby corrected as shown below:

In the Claims

Column 19, Line 26, Claim 1 delete "$D_{DC}$ and", and insert --$D_{DC}$, and--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*